United States Patent

[11] 3,634,686

| [72] | Inventor | Junichiro Sekita<br>Tokyo, Japan |
| --- | --- | --- |
| [21] | Appl. No. | 876,259 |
| [22] | Filed | Nov. 13, 1969 |
| [45] | Patented | Jan. 11, 1972 |
| [73] | Assignee | Rigaku Denki Company Limited<br>Tokyo, Japan |
| [32] | Priorities | June 17, 1969 |
| [33] | | Japan |
| [31] | | 44/47313;<br>June 17, 1969, Japan, No. 44/56557 |

[54] X-RAY STRESS-MEASURING APPARATUS
2 Claims, 8 Drawing Figs.

[52] U.S. Cl. .................................................. 250/51.5
[51] Int. Cl. ............................................. G01n 23/20
[50] Field of Search ..................................... 250/51.5

[56] References Cited
UNITED STATES PATENTS

| 3,051,834 | 8/1962 | Shimula et al. | 250/51.5 |
| 3,177,360 | 4/1965 | Hague, Jr. et al. | 250/51.5 |
| 3,322,948 | 5/1967 | Baak et al. | 250/51.5 |

*Primary Examiner*—William F. Lindquist
*Attorney*—Alfred W. Breiner

ABSTRACT: The present invention provides an X-ray stress-measuring apparatus wherein the angle of diffraction of X-rays is found out under rotary oscillation of a base equipped with an X-ray tube and an X-ray detector through a small angular range.

PATENTED JAN 11 1972 3,634,686
SHEET 1 OF 2
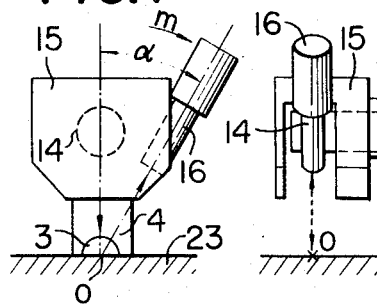
FIG. 1
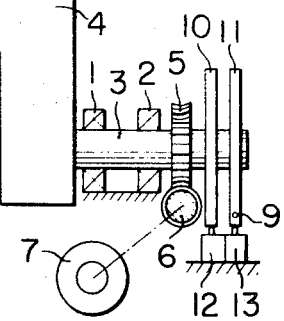
FIG. 2
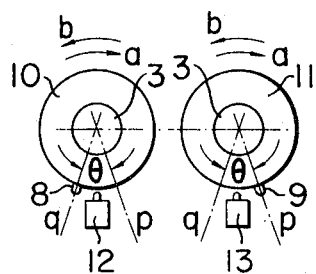
FIG. 3
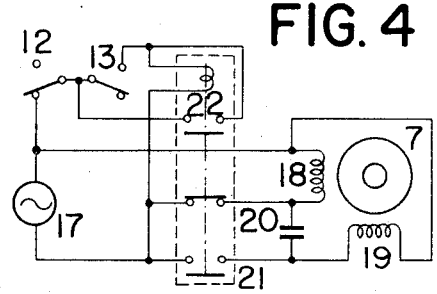
FIG. 4
FIG. 5
FIG. 6
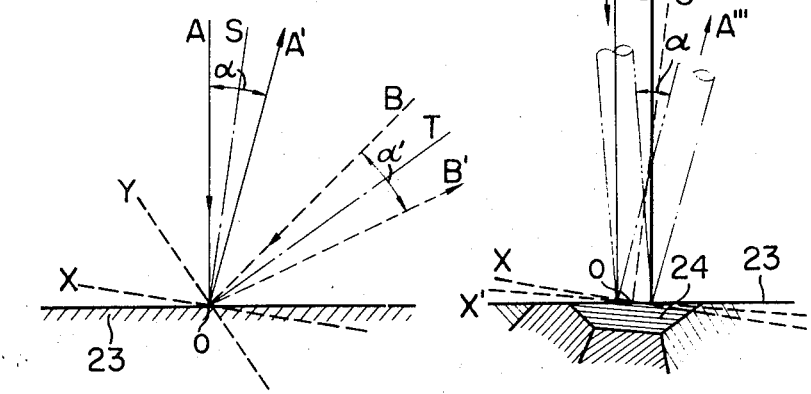

X-RAY STRESS-MEASURING APPARATUS

The present invention relates to an X-ray stress-measuring apparatus.

It is possible to know the internal stress of metallic materials by measuring the angle of diffraction of X-rays. In order to measure the stress of a very small section of the material such as a welded portion, a slender X-ray beam must be projected onto the section. Consequently, if the crystals of the specimen are large in grain size, the number of crystals so oriented as to diffract the projected X-rays is small, so that the diffracted X-rays are very weak. The internal stress is thus measured with less accuracy or even impossible to be measured in some cases.

An object of the present invention is to provide an X-ray stress-measuring apparatus capable of intensifying the diffracted X-rays and thus increasing the measuring accuracy.

Another object of the present invention is to provide an X-ray stress-measuring apparatus capable of finding out diffraction patterns always from the same crystal lattice plane by varying the angle of incidence of X-rays.

In the accompanying drawing:

FIG. 1 is a front elevational view of the apparatus according to the present invention;

FIG. 2 is a side elevational view of the apparatus in FIG. 1;

FIG. 3 is a view illustrating the construction of a part of the apparatus in FIG. 1;

FIG. 4 is an circuit diagram of a part of the apparatus in FIG. 1;

FIGS. 5 and 6 are schematic diagrams illustrating the principle of the present invention;

Figure 7:
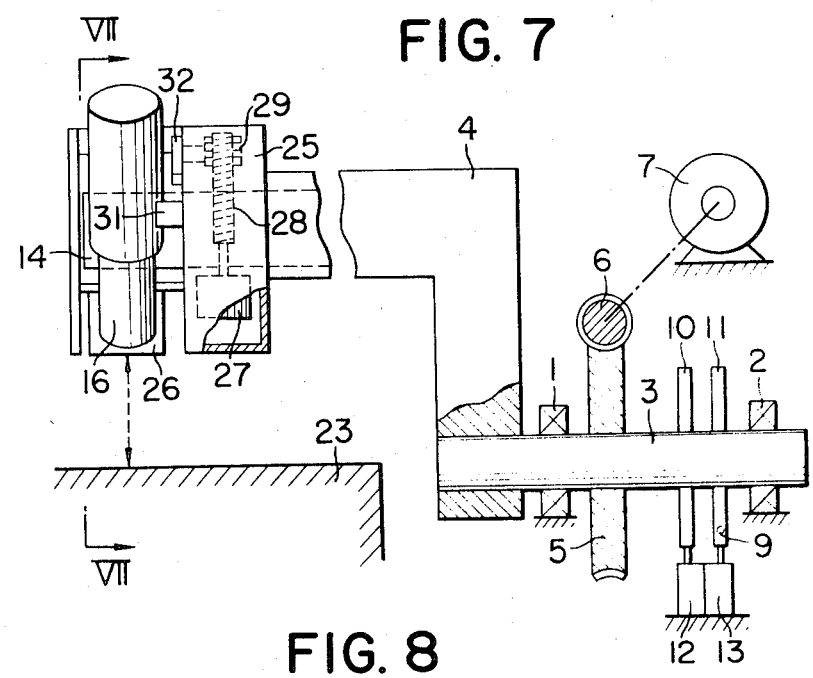
FIG. 7 is a side elevational view partially with longitudinal section of another embodiment of the present invention.

Now referring to the drawing, in an embodiment of the present invention shown in FIGS. 1 to 4, an L-shaped base 4 is fixed at one end to a rotating shaft 3 supported by bearings 1 and 2. A worm wheel 5 secured to the rotating shaft 3 meshes with a worm 6, which is connected to a reversible motor 7. Further, mounted on the shaft 3 are two cams 10 and 11 having projections 8 and 9 (FIG. 3), to which cams switches 12 and 13 are opposed. Mounted on the other end of the L-shaped base are an X-ray tube 14 and an auxiliary base 15 which holds an X-ray detector 16 such as a Geiger-Müller counter.

A small electric motor (not shown) is provided in the auxiliary base 15 for driving the X-ray detector 16 along a circular arc about a point on the axis of the shaft 3, as shown by an arrow m in FIG. 1. The motor 7 (FIG. 2), its power source 17 and the switches 12 and 13 are wired, for example, in such a manner as shown in FIG. 4; normally, the switches 12 and 13 keep the conditions of FIG. 4, under which the exciting coil 18 of the motor 7 is directly connected to the power source 17 and the exciting coil 19 is connected to the power source through a condenser 20. Thus, the motor 7 rotates, for example, clockwise to turn the cams 10 and 11 as shown by arrows a in FIG. 3. When a broken line p reaches the position of the switch, the projection 9 of the cam 11 pushes the movable piece of the switch 13, thus closing this switch to operate a relay 21. Consequently, the coil 19 is directly connected to the power source 17 and the coil 18 is connected thereto through the condenser 20, so that the motor 7 rotates in the opposite direction to turn the cams 10 and 11 in the direction of arrows b. The switch 13 is then separated from the cam 11, but the relay 21 holds itself because of making of the contact 22, so that the above-mentioned condition remains as it is.

When a broken line q in FIG. 3 reaches the position of the switch, the projection 8 of the cam 10 pushes the movable piece of the switch 12 to open this switch, thus breaking the self-holding current to the relay 21 to recover it. The motor 7 begins to rotate again in the clockwise direction to turn the cams 10 and 11 in the direction of the arrows a. With these operations, the shaft 3 rotates oscillatorily in the range between the broken lines p and q, the angle of which can be easily adjusted by varying the mounting angle of the cams 10 and 11.

The described mechanism is arranged in such a way that the axis of the shaft 3 lies along the surface of a specimen 23 and the base 4 is arranged in such a way that a slender beam of parallel X-rays falls from the X-ray tube 14 substantially in perpendicular to the specimen surface upon a point thereon lying on the axis of the shaft 3, as shown by a dotted line in FIGS. 1 and 2. Then the shaft 3 is rotated in an oscillatory way, as mentioned above, through a small angular range $\theta$ of, for example, a few degrees. When simultaneously the detector 16 is swiveled from the side of the X-ray tube 14 in the direction of arrow m, it swings about the point of incidence O of X-rays with its X-ray receiving window always facing the point O. When the angle between the incident X-ray beam and detector 16 attains a proper value, X-rays diffracted by the specimen surface fall on the detector. Thus, the angle of diffraction of X-rays incident upon the specimen substantially at right angles can be found out from the angle $\alpha$. Then the base 4 is turned until the incident X-ray beam falls on the point O substantially at 45° and the angle of diffraction of X-rays is determined by the same operation.

The internal stress of the specimen is found out from the difference of angles $\alpha$ and $\alpha'$ of the diffracted X-ray beams A' and B' occurring from the X-ray beams A and B incident upon the specimen 23, for example, at 90° and 45°, as shown in FIG. 5. In this case, the diffracted X-ray beam A' or B' originates from crystals having a lattice plane parallel to the plane X or Y which is right-angled to the bisector S or T of the angle $\alpha$ or $\alpha'$. When the stress of a fine part is to be measured by throttling the incident X-ray beam, the number of crystal grains radiated by the X-rays is decreased, if the crystals are large in grain size, so that the number of crystals having a lattice plane parallel to the plane X or Y becomes very small or in some cases no such crystal is to be found.

FIG. 6 shows this case; assuming that the X-ray beam a projected perpendicularily to the specimen 23 penetrates to a crystal grain 24 the lattice plane of which is parallel to a plane X' slightly deviated from the plane X, no diffracted X-ray is obtained. In such a case, when the incident X-ray beam is inclined as A" until the plane X' is positioned at right angles to the bisector S of the angle $\alpha$, a diffracted X-ray beam A''' occurs, from which the angle $\alpha$ can be known. Hence, by oscillatory rotation of the base 4 including the X-ray tube 14 and the detector 16 through a small angular range $\theta$, the crystal grains participating in diffraction are remarkably increased in number, thus intensifying the diffracted X-rays. Thus, they are positively detected to facilitate accurate measurement.

In this way, the apparatus according to the present invention determines the angle of diffraction while rotating the base with X-ray tube and X-ray detector in an oscillatory way through a small angular range $\theta$. Even when the crystal grain size of the specimen is large or the internal stress of a fine part is to be measured by throttling the incident X-ray beam, the number of crystal grains participating in diffraction is thus large enough to enable accurate measurement. For specimens having a large crystal grain size, if the X-ray beam is projected at a fixed angle as is the case with conventional apparatuses the number of planes for diffracting it may be very small due to orientation of crystals and thus the diffraction pattern may be distorted. On the contrary, the apparatus according to the present invention increases the number of lattice planes for diffraction by varying the angle of incidence of X-rays, thereby to facilitate accurate measurement. Moreover, since the specimen is held in the fixed condition, stationary, large and heavy ones can be also measured.

According to another feature of the present invention, a driving mechanism for turning a base equipped with an X-ray tube and a detector at an angular velocity of one-half of that of the detector may be provided.

Figure 8:
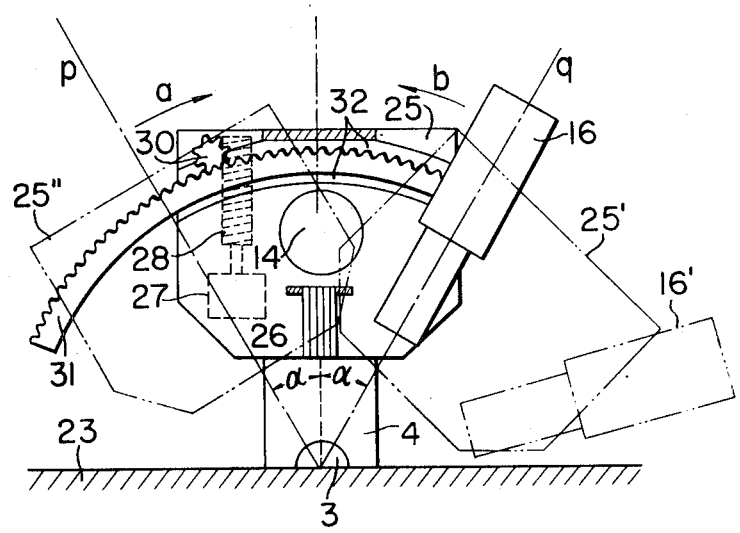
FIG. 8 is a sectional view through the line VII—VII in FIG. 7.

Such a driving mechanism will now be described. In FIGS. 7 and 8, an L-shaped base 4 is fixed at one end to a rotating shaft 3 supported by bearings 1 and 2. A worm wheel 5 secured to the rotating shaft 3 meshes with a worm 6, which is connected to a synchronous motor 7. Further, mounted on the shaft 3 are two cams 10 and 11, to which switches 12 and 13 are opposed respectively for stopping the motor at a desired position. These parts are the same as in FIG. 2.

An X-ray tube 14 and a goniometer 15 are mounted on the other end of the base 4 and a soller slit 26 is arranged in front of the X-ray tube in such a way that the X-ray tube 14 radiates parallel X-rays onto the axis of the shaft 3 at right angles thereto. Provided in the goniometer 15 is a small synchronous motor 27, to which a worm 28 is connected, which is engaged by a worm wheel 29. Further, a wheel 30 directly connected to the worm wheel 29 meshes with a circular arc-shaped rack 31. The rack 31 is formed as a circular arc about the axis of the shaft 3 and engaged in a guide way 32 provided in the goniometer 15. Consequently, when the motor 27 is started, the rock 31 slides in the guide way. Mounted on one end of the rack 31 is an X-ray detector 16 such as a Geiger-Müller counter. The X-ray detector 16 is so fixed to the rack 31 that its X-ray receiving window faces always the intersecting point of the axis of the shaft 3 and the projected X-ray beam. When the motor 7 is started, the base 4 rotates in the direction of arrow $a$ and, when the motor 27 is started, the detector 16 rotates in the direction of arrow $b$, with its X-ray receiving window always facing the axis of the shaft 3, at an angular velocity twice as much as that of the base 4.

The described equipment is arranged in such a way that the axis of the shaft 3 lies along the surface of a specimen 23 and, with the motors 7 and 27 stopped, the base 4 is fixed in such a way that a beam of X-rays falls from the X-ray tube 14 upon the specimen surface 23 in perpendicular thereto. Full lines in FIGS. 7 and 8 indicate this position.

For normal measurements, only the motor 27 is started first in this condition to rotate the detector 16 in the direction of arrow $b$ for detecting diffracted X-rays, thereby to find out the angle of diffraction of X-rays incident upon the specimen surface at 90°. Then the shaft 3 is turned until the X-ray beam from the X-ray tube 14 falls upon the specimen surface at the same point at 45°. The motor 27 is then started to do a similar measurement, so that the angle of diffraction of X-rays incident upon the specimen surface at 45° can be determined. Broken lines 25' and 16' in FIG. 8 indicate the position of the goniometer and detector in this condition. The internal stress of the specimen can be known from the difference between the two described angles of diffraction.

As apparent from the goniometer shown by a broken line 25'' in FIG. 8, the X-ray tube 14 and the detector 16 may be also so positioned that the axis $p$ of the X-ray beam incident upon the specimen surface and the axis $q$ of the detector 16 form the same angle $\alpha$ against the normal of diffraction plane N$p$ right-angled to the specimen surface. When the motors 7 and 27 are started simultaneously in this condition, the goniometer 25'' displaces in the direction of arrow $a$ at an angular velocity of, for example $\theta°$/min., and the detector 16 moves thereon in the direction of arrow $b$ at an angular velocity of 2 $\theta°$/min. It follows that the X-ray tube 14 and the detector 16 move relative to the fixed specimen 23 at an angular velocity of $\theta°$/min. in the opposite direction. Hence, when the output of the detector 16 is recorded, for example, by an automatic recorder, a diffraction pattern for lattice planes parallel to the specimen surface can be obtained. If a similar measurement is further performed with the normal of diffraction plane forming an angle of 45° against the specimen surface, the spacing between lattice planes parallel to and inclined, for example, at 45° against the specimen surface can be accurately determined. A precise diffraction pattern can be, therefore, obtained, thus permitting accurate measurement of deformation even for specimens with large crystal grains.

In this way, the described apparatus according to the present invention enables, with a driving mechanism for turning a base equipped with an X-ray tube and a detector at an angular velocity of one-half of that of the detector, accurate observation of a diffraction pattern for the same lattice plane, as well as measurement of deformation by a conventional system. With the aid of this diffraction pattern, accurate measurement of deformation is possible even for specimens with large crystal grains. Moreover, the apparatus can be used also for large and heavy and so unconveyable specimens.

What is claimed is:

1. An X-ray stress measuring apparatus comprising a base adapted to be rotatable about the axis of a straight line passing through the point of incidence of X-rays on the surface of a specimen; an X-ray tube mounted on said base for radiating X-rays to the specimen surface; a detector of diffracted X-rays arranged on said base; one of said tube and detector adapted to be rotatable about the axis of said straight line; means for rotating the rotatable one of said tube and detector; and driving means for oscillatorily rotating said base through a small angular range about said axis whereby the rotatable one of said tube and detector is rotated independently of the other to vary the diffraction angle while both said tube and detector are being oscillated with the same amplitude and frequency to optimize the diffraction and detection of X-rays from the different lattice planes of the grains in the specimen.

2. An X-ray stress measuring apparatus as set forth in claim 1, further comprising additional driving means for simultaneously rotating said base and the other of said tube and detector about said axis whereby the X-ray tube rotates in the opposite direction at an angular velocity of one-half of that of said detector.

* * * * *